United States Patent [19]

Hammer

[11] 4,070,532

[45] Jan. 24, 1978

[54] ETHYLENE CARBON MONOXIDE COPOLYMERS CONTAINING EPOXY SIDE GROUPS

[75] Inventor: Clarence Frederick Hammer, Wilmington, Del.

[73] Assignee: E. I. Du Pont de Nemours and Company, Wilmington, Del.

[21] Appl. No.: 762,826

[22] Filed: Jan. 26, 1977

Related U.S. Application Data

[60] Division of Ser. No. 681,741, April 29, 1976, abandoned, which is a continuation-in-part of Ser. No. 580,515, May 23, 1975, abandoned.

[51] Int. Cl.$^2$ .................. C08F 3/40; C08F 13/04; C08G 67/00
[52] U.S. Cl. .................. 526/11.2; 260/63 CQ; 526/11.1
[58] Field of Search .................. 526/11.1, 11.2; 260/63 CQ

[56] References Cited

U.S. PATENT DOCUMENTS

| | | | |
|---|---|---|---|
| 2,495,286 | 1/1950 | Brubaker | 526/11.1 |
| 2,641,590 | 6/1953 | Little | 526/11.1 |
| 3,530,109 | 9/1970 | Fenton | 526/11.1 |
| 3,676,401 | 7/1972 | Henry | 526/11.1 |
| 3,780,140 | 12/1973 | Hammer | 526/11.1 |
| 3,790,460 | 2/1974 | Weintraub | 526/11.1 |
| 3,843,594 | 10/1974 | Labana et al. | 260/42.18 |
| 3,948,850 | 4/1976 | Hudgin | 526/11.1 |
| 3,948,873 | 4/1976 | Hudgin | 526/11.1 |

*Primary Examiner*—Herbert J. Lilling

[57] ABSTRACT

Copolymers of certain amounts of ethylene, carbon monoxide, a third monomer copolymerizable therewith to provide solid but flexible polymers, and a fourth monomer containing epoxy side groups provide new and useful copolymers. The copolymers are useful as blending resins with thermosetting resins. Blends of these copolymers with thermosetting resins provide performance unattainable with the thermosetting resin alone in terms of flexibility, toughness, and adhesion. Such blends may be used, for example, to produce flexible, semirigid or rigid films, coatings, fibers, foams or molded articles.

30 Claims, No Drawings

ETHYLENE CARBON MONOXIDE COPOLYMERS CONTAINING EPOXY SIDE GROUPS

CROSS-REFERENCE TO RELATED APPLICATIONS

This application is a divisional of copending application Ser. No. 681,741, filed Apr. 29, 1976 and now abandoned, which is a continuation-in-part of application Ser. No. 580,515, filed May 23, 1975, now abandoned.

BACKGROUND OF THE INVENTION

1. Field of the Invention

This invention relates to ethylene copolymers. More particularly this invention relates to copolymers of ethylene, carbon monoxide, a flexibilizing monomer, and a fourth monomer which contains epoxy side groups.

2. Description of the Prior Art

Ethylene polymers are characterized by a low polarity and low reactivity. They are like waxes in this respect, having a low dielectric constant and being soluble in hot oils, hot wax and hot hydrocarbons. They also are well known to be very inert. For some uses it is desirable to modify the ethylene polymers to make them flexible, to impart more polarity to the polymers, and to be able to use them in reaction with other resins. A small degree of polarity and a certain amount of flexibility can be imparted to an ethylene polymer by incorporation therein of unsaturated organic esters, such as vinyl acetate or acrylates. However, to obtain a high degree of polarity high levels of ester are required which in turn adversely affects the inherit advantage of the long ethylene chain, e.g., low cost, good low temperature behavior, etc. Thus it is desirable to increase the polarity of an ethylene copolymer while retaining the hydrocarbon chain as the major feature of the polymer. Ethylene copolymers, however, modified to be more flexible and more polar may still be relatively unreactive.

The art regarding thermosetting resins and especially blends with other polymers will now be considered. Commercially available thermosetting resins such as phenolics, epoxys, etc., have been found to be useful because of the retention of their performance at elevated temperatures. This retention of performance is associated with the crosslinking or curing action inherent in the structure of the thermosetting resins utilized. However, this retention of high temperature performance is accompanied by high stiffness and brittleness making it desirable to lower the stiffness of such material or if some stiffness is desired by providing a higher degree of toughness. The obvious solution, to blend a flexible polymer into the thermosetting resin, has not been successful to the best of our knowledge. Molecular compatibility has not been achieved; the desirable properties of the thermoset are lost.

SUMMARY OF THE INVENTION

According to the present invention there are provided novel copolymers consisting essentially of, by weight (a) 40 to 90 percent ethylene; (b) 2 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, alpha-olefins of 3 to 20 carbon atoms, norbornene and vinyl aromatic compounds; and (d) 0.1 to 15.0 percent of an ethylenically unsaturated monomer of 4 to 21 carbon atoms containing an epoxy group.

Preferred novel copolymers, in addition to (a) ethylene and (b) carbon monoxide, are prepared from (c) a monomer copolymerizable therewith taken from the class consisting of vinyl alkanoates, e.g., vinyl acetate, vinyl propionate, vinyl butyrate; alkyl acrylates and alkyl methacrylates wherein alkyl is from 1 to 20 carbon atoms; and (d) an epoxy-containing monomer taken from the class consisting of epoxy esters of copolymerizable unsaturated organic acids, epoxy ethers of vinyl ethers and allyl ethers and mono-epoxy substituted di-olefins of 4 to 12 carbon atoms.

A specific preferred copolymer is prepared from (a) ethylene, (b) carbon monoxide, (c) vinyl acetate, and (d) glycidyl acrylate or methacrylate.

The preferred copolymers contain the following weight percent of components (a) to (d):

a. 45 to 90, more preferably, 50 to 70.
b. 5 to 20, more preferably, 7 to 18.
c. 10 to 33, more preferably, 20 to 30.
d. 0.2 to 9, more preferably, 0.5 to 6.

The copolymers normally have a melt index within the range of 0.1 to 3,000; preferably 5 to 500.

DETAILED DESCRIPTION OF THE INVENTION

The copolymers of this invention consist essentially of the above described amounts of ethylene, carbon monoxide and monomers (c) and (d) which are copolymerizable ethylenically unsaturated organic compounds. Monomers (c) are selected from the class consisting of unsaturated mono- or dicarboxylic acids of 3 to 20 carbon atoms, esters of such unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, and copolymerizable unsaturated hydrocarbons, such as alpha-olefins of 3 to 20 carbon atoms, ring compounds, such as norbornene, and vinyl aromatic compounds. Vinyl acetate is preferred monomer (c).

Monomers (d) are ethylenically unsaturated monomers of 4 to 21 carbon atoms which contain an epoxy group. Such monomers are taken from the class consisting of epoxy esters of copolymerizable unsaturated organic acids, e.g., acrylic or methacrylic; the epoxy ethers of vinyl ethers and allyl ethers, e.g., glycidyl vinyl ether, vinyl cyclohexane monoxide, etc., or the mono-epoxy substituted di-olefins of 4 to 12 carbon atoms. Glycidyl acrylate and methacrylate are preferred monomers (d).

In preparing the copolymers of the present invention, commercially available ethylene, carbon monoxide and unsaturated monomers (c) and (d) of about 100 percent purity are used initially and in supplying continuous make-up for the polymerization feed stream. The reactor vessel used is capable of withstanding high pressures and temperatures, and is equipped with a high speed motor-driven stirrer and pressure relief valves, as well as jacketed walls for circulating heating or cooling fluids in order to control temperature. Carbon monoxide and the other monomers are pumped into the ethylene monomer feed stream at the pressure of the reactor, and then the mixture of monomers is pumped at reactor pressure into the reactor, either together or separately. Catalyst, as necessary, is pumped into the reactor through a separate feed line.

A mixture of copolymer and monomer exits the reactor, and the pressure is reduced as the mixture flows into a separator. Monomers leave the separator and are either destroyed or pumped for recycle to the reactor together with make-up monomers. Molten copolymer leaves the separator in a stream, from which it is cooled and further processed, e.g., the copolymer may be cut into suitable sized particles and put into suitable containers for shipping.

The flow of ethylene, carbon monoxide, monomers (c) and (d) and catalyst into the reactor is carefully controlled so that they enter the reactor in constant continuous molar ratios and at the same continuous rate at which product and unreacted monomers are discharged from the reactor. The rates and molar ratios are adjusted so as to provide in the product copolymer, by weight, 40 to 90 percent ethylene, 2 to 20 percent carbon monoxide, 5 to 40 percent of monomer (c) and 0.1 to 15 percent monomer (d). Effective stirring, usually at a rate of at least 0.25 horsepower per gallon of reactor volume, is provided in order to keep the reacting monomers in intimate admixture throughout the reactor. The reactor temperature should be at least 140° C. It is preferred that the reactor temperature be maintained within the range of about 155°–300° C., most preferably 155°–225° C., and that the reactor pressure be maintained within the range of 5000–60,000 psi, preferably about 20,000–35,000 psi.

It is important in preparing the copolymers of the present invention that the contents of the reactor be kept uniform with respect to the weight ratios of ethylene, carbon monoxide and monomers (c) and (d) to produce the solid copolymers of the present invention. None of the monomers should be depleted so that not less than all of the monomers are reacting. Since the various monomers react at different rates, a larger percentage of faster reacting monomers will react in a given time. Consequently, the ratio of feed rate for the monomers will be different from the desired ratio of those monomers in the copolymer produced. Thus, carbon monoxide reacts at a rate about five times that of ethylene, so that when 10 percent of the ethylene has been incorporated in polymer, about 50 percent of the carbon monoxide present is in polymer. Conditions required to produce specific copolymers vary, depending on the reactivity of monomers (c) and (d), e.g., vinyl acetate reacts at about the same rate as does ethylene, whereas other monomers such as methyl methacrylate react about as fast as or faster than carbon monoxide. The epoxy-containing monomers (d) may react at rates which vary between the speed of reaction of ethylene and carbon monoxide.

The free-radical polymerization catalyst employed in the process can be any of those commonly used in the polymerization of ethylene, such as the peroxides, the peresters, the azo compounds, or the percarbonates. Selected compounds within these groups are dilauroyl peroxide, ditertiary butyl peroxide, tertiary butyl perixobutyrate, tertiary butyl peracetate, $\alpha,\alpha'$-azobisisobutyronitrile and other compounds of comparable free-radical activity. Usually the catalyst will be dissolved in a suitable inert organic liquid solvent such as benzene, kerosene, mineral oil or mixtures of solvents. The usual catalyst level is used, i.e., about 25 to 2500 ppm, preferably about 75 to 500 ppm, based on the weight of the monomers fed to the reactor.

For the purpose of this invention it is desirable to understand the nature of thermosetting resins and the molecular character of blends of high polymers. Thermosetting resins, such as the phenolic resins, are produced as low molecular weight polymers for processing into the desired form prior to the curing step. (These resins are not formable after curing.) The low molecular weight resins may be liquids, or if solid at room temperature, they become fluid upon melting. This is in contrast to the very high molecular weight and high melt viscosity of the conventional thermoplastic resin. When one attempts to disperse a high molecular weight thermoplastic resin in the low viscosity thermosettable resin, the blend can only be achieved if the thermoplastic resin is truly soluble in the low molecular weight liquid. Otherwise the thermoplastic resin remains in the liquid as relatively large particles. The first requirement in this invention, then, is the discovery of the molecular structure which will provide a thermoplastic resin which is soluble in the liquid thermosettable resin.

The curing of a thermosetting resin occurs by the chemical linking of the thermosettable molecules through sites which occur on the average at more than two per molecule. When a nonreactive thermoplastic polymer is dissolved in the thermosetting resin, these thermosettable molecules move around rapidly during curing to exclude the thermoplastic polymer. The thermoplastic polymer is thereby forced out of the solidifying thermosetting composition. As a result a two phase system is formed. One phase is the rigid brittle thermosetting matrix. The second phase consists of the previously dissolved thermoplastic resin. The second requirement of this invention, then, is the incorporation of a reactive epoxy group in the thermoplastic copolymer which will provide a site through which the thermoplastic copolymer participates in the curing step. The thermoplastic copolymer is thereby intimately bound into the matrix of the cured thermosetting resin.

To summarize, the thermoplastic resin is intended to act as a useful modifier for the thermosetting resin. To be effective, it must be dispersed on a molecular scale, i.e., dissolved in the thermosetting resin before the cure; and it must remain substantially dispersed in the thermosetting resin after cure.

Another point which must be recognized is that there are two useful degrees of dispersion in terms of the description above. One is when the thermoplastic resin is so well dispersed, after cure, that the resultant blend is clear. A molded cured film from such a blend is more flexible than the unmodified thermosetting resin. It has a modest and useful degree of elongation before the sample fails; but when the sample does fail, it fails in a brittle fashion without much absorption of energy. It is well known in the art, however, that rubbery impact modifiers for rigid thermoplastic resins should be finely dispersed as a separate phase which is intimately bonded to the rigid phase.

Thermosetting resins, on the other hand, are much more difficult to toughen. The present invention embodies the discovery of adjusting the structure of the copolymers to achieve the same type of effect; i.e., the copolymers of the present invention can be adjusted so they dissolve only partially in the uncured thermosetting resin. Then, after curing, the tiny agglomerates of the thermoplastic resin of the present invention are capable of absorbing impact energy, but do so, in fact, only because they are also bonded through reactive sites to the molecules of the cured thermosetting matrix.

The copolymers of the present invention can be used to make curable blends with effective amounts of solid organic thermosetting resins taken from the class consisting of phenolic resins, e.g., phenol formaldehyde resins; epoxy resins, and melamine formaldehyde resins. The term "phenolic resins" is meant to include thermosetting phenol-aldehyde resins, e.g., those made from phenol, cresol, e.g., m-p-cresol mixture, p-cresol or cresylic acid, resorcinol with aldehydes such as formaldehyde and furfural. The one-step type (resoles) or the two-step type (novalaks) are useful (U.S. Pat No. 3,438,931). Also useful are phenol-formaldehyde resins modified with alkyl phenols (e.g., cresols), polyhydric phenols (e.g., resorcinol, hydroquinone, etc.), or polyphenols (e.g., Bisphenol-A).

EXAMPLES OF THE INVENTION

The following Examples illustrate the invention wherein the percentages are by weight unless indicated.

EXAMPLES 1 to 14

Copolymers of ethylene, carbon monoxide, vinyl acetate, and a fourth comonomer as specified in Table I were prepared by mixing the respective monomers at the feed rates shown in Table I, then feeding the resultant mixture into a 700 cc highly stirred reaction vessel together with a catalyst of the type and amount given in Table I.

The reactor pressures and temperatures and the conversion of monomer to polymer are also given in Table I. The reactor residence time was 4.5 minutes. The melt index of the polymer reported in Table I was determined according to ASTM D1238-65T, Condition E.

TABLE I
COPOLYMER SYNTHESIS

| | Product Copolymer | | | Reaction Conditions | | | | Feed Ratio E/Comonomer (c)/ CO/Comonomer (d) (Parts by wt.) | |
|---|---|---|---|---|---|---|---|---|---|
| Ex. No. | Copolymer Type | Monomer Ratio | Melt Index | Pressure (Atmos.) | Temp. (°C.) | Catalyst Type | Catalyst (a) Concentration | | Conversion (%) |
| 1 | E/VA/CO/GMA | 60/25/13/2.4 | 52 | 1630 | 180 | PB | 0.40 | 11/4.1/0.35/0.19 | 10.2 |
| 2 | E/VA/CO/GMA | 53/30/11/5.6 | 660 | 1630 | 181 | PB | 0.30 | 10/5.0/0.53/0.21 | 11.8 |
| 3 | E/VA/CO/GMA | 52/27/13/8.4 | 45 | 1630 | 179 | PL | 0.42 | 10/4.9/0.43/0.20 | 10.4 |
| 4 | E/VA/CO/GMA | 56/26/15/3.1 | 50 | 1630 | 161 | PL | 0.56 | 10/4.4/0.35/0.11 | 11.0 |
| 5 | E/VA/CO/GMA | 61/21/15/3.0 | 94 | 1630 | 153 | PL | 1.30 | 10/3.1/0.42/0.096 | 9.9 |
| 6 | E/VA/CO/GMA | 64/21/10/5.4 | 70 | 1830 | 181 | RA55 | 0.59 | 10/3.2/0.20/0.14 | 11.5 |
| 7 | E/VA/CO/GMA | 62/22/10/6.0 | 58 | 1830 | 180 | RA55 | 0.59 | 10/3.3/0.22/0.15 | 10.8 |
| 8 | E/VA/CO/GMA | 67/17/10/5.9 | 84 | 1830 | 181 | RA55 | 0.82 | 10/2.6/0.22/0.15 | 11.1 |
| 9 | E/VA/CO/GMA | 67/17/10/5.8 | 96 | 1830 | 181 | RA55 | 0.88 | 10/2.6/0.17/0.15 | 11.6 |
| 10 | E/VA/CO/GA | 64/21/9/5.9 | 72 | 1830 | 180 | RA55 | 0.66 | 10/3.3/0.21/0.14 | 11.0 |
| 11 | E/VA/CO/GMA | 61/25/10/4.5 | 51 | 1830 | 180 | PO | 0.39 | 10/4.0/0.30/0.10 | 10.3 |
| 12 | E/VA/CO/GMA | 63/23/7/7.0 | 65 | 1830 | 174 | RA55 | 0.53 | 10/2.6/0.20/014 | 11.0 |
| 13 | E/VA/CO/GMA | 64/18/12/6.3 | 80 | 1830 | 180 | RA55 | 1.03 | 10/2.6/0.25/0.14 | 11.4 |
| 14 | E/VA/CO/GMA | 63/18/13/5.6 | 45 | 1830 | 180 | RA55 | 0.72 | 10/2.6/0.34/0.15 | 11.5 |

PB = t-Butyl Peroxyisobutyrate
PO = t-Butyl Peroctoate
(a) Lbs./M Lbs. polymer
PL = t-Butyl Peroxypivalate
RA55 = 2-t-Butyl Azo-2-Cyano-4-Methoxy-4-Methyl Pentane
GMA = Glycidyl Methacrylate
GA = Glycidyl Acrylate These curable blends may comprise 1 to 99 percent of the above copolymers and 1 to 99 percent of the thermosetting resins. Preferably the copolymer is present in the blend in a percent of 5 to 95 and the thermosetting resin is present in the blend in a percent of 5 to 95. A particularly preferred percentage range for the copolymer is 10 to 50 percent, and the thermosetting resin is 90 to 50 percent.

The above curable blends may be formed into a sheet, a block for molding purposes, or a fiber before the blends are cured. The curable blends can be a solid form which is grindable into a powder and then formed into the molding or shaped article, into a film, a coating, or into a fiber before curing.

Cured compositions, in the forms described above, result from heating, e.g., oven, mold, etc., the above curable blends.

The curable blends described herein may be filled with the conventional fillers used in thermosetting systems. These fillers may be wood flour, asbestos, silica, fiberglass, cotton flock, mica, macerated fabric and cord, rag, carbon black, or metal, such as iron, lead, copper, etc.

The curable blends may be used to produce flexible, semirigid or rigid films, coatings, fibers, molded articles, foamed articles and adhesives.

EXAMPLE 15

A blend containing 15% of the copolymer of Example 2 with a novalak phenolic resin (supplied by Durez Division of Hooker Chemical Company as Durez® 14000, a powdered 2-step type phenol-formaldehyde resin containing about 7% hexamethylenetetramine) was made by dissolving both polymers in tetrahydrofuran. The blend was dried on a steam plate and then pressed into a 2 mil film. The film was cured for 15 minutes at 165° C. in the press at a pressure of 20,000 psi. The cured film from this blend was clear, indicating good compatibility, and could be bend almost 180° before breaking.

This result is in contrast to the behavior of a film from the straight cured novalak phenolic resin, which is very brittle and breaks under a very small strain.

The compatible nature of this blend is in contrast to that encountered using an ethylene/vinyl acetate/glycidyl methacrylate copolymer, into which no carbon monoxide was copolymerized. An opaque incompatible blend was obtained when this second copolymer was used, indicating the essential nature of the carbon monoxide constituent. The comonomer ratio of this copolymer was 71/22/7.

EXAMPLE 16

A solution blend was made containing 35% of the polymer of Example 2 and the novalak phenolic resin of Example 15. The blend was pressed into a 3 × 3 × ⅛ bar and cured for 10 minutes at 150° C. This bar was cut into bars 2½ × ½ × ⅛ inches. The Izod impact strength of these bars was 0.39 ft. lb./inch compared to a value of 0.25 ft. lb./inch for the unmodified phenolic resin.

EXAMPLE 17

A 50/50 blend was made from solution using the copolymer of Example 3 and the novalak resin of Example 15. The uncured film, cast from the solution, was clear, indicating compatibility. This film was cured in an air oven at 110° C. for 20 min. to give a clear, flexible film. The film could be bent double and creased without cracking.

This cured film was placed in a beaker containing boiling acetone. This sample stayed as a film after stirring for 30 minutes, indicating a complete cure.

EXAMPLE 18

A 50/50 blend was made on a 2-roll mill at a temperature of 75° C. 15 Grams of the polymer of Example 3 was blended with 15 grams of a powdered 1-step type phenolic resin (resole) supplied as Durez® 26164. A 10 mil film was melt pressed from this blend and found to be hazy, indicating only partial compatibility. This blend was pressed into a bar and cured. The Izod impact strength of this bar was 2.5. This is a very high value for a cured polymer.

EXAMPLE 19

15 g. of the polymer of Example 3 was milled with 15 g. of a powdered two-step phenolic resin (novalak) Durez® 22091 sold by Hooker Chemical Co., which contained no curing agent. The blend was pressed into a 10 mil film and then held in the press at 150° C. for one (1) hour to cure. The film was clear, showing compatibility and was insoluble in boiling tetrahydrofuran showing a cure.

EXAMPLE 20

A solution 50/50 blend was made from the polymer of Example 3 and the novalak phenolic resin described in Example 15 containing 8 percent of hexamethylenetetramine. A 10 mil film was pressed at 100° C., the temperature was raised to 150° for 30 minutes. The film was clear.

The tensile properties of this film were: tensile strength, 2150 psi; elongation, 60 percent; tensile modulus, 18,000 psi. When the broken specimens were returned to the original positions, the elongation above was found to be >95% elastic (ASTM D-1708-66 [0.2 inches/min. crosshead speed]).

EXAMPLE 21

A solution blend in tetrahydrofuran was made using 0.5 g. of the polymer of Example 1 and 1.5 g. of liquid diglycidyl ether of bisphenol A with an epoxy equivalent weight of about 190 and a viscosity of about 13,000 cps. at 25° C. (Epon® 828 sold by Shell). 0.15 g. of a curing agent triethylenetetramine was added. The solution was evaporated to dryness to form a film. The film was cured by heating over a steam bath for one (1) hour. The film was clear and could be bent double with no indication of brittleness. This behavior was contrast to the brittle behavior of a control film made in the same fashion, but without the polymer of Example 1.

EXAMPLE 22

A solution blend was made in tetrahydrofuran of 50 percent of the polymer of Example 2 and 50 percent of a melamine-formaldehyde resin, hexamethoxymethylmelamine sold by American Cyanamid (Cymel® 301). p-toluene sulfonic acid was added to give 0.25 percent by weight, exclusive of the solvent, as a catalyst for cure. This solution was coated on aluminum, dried and cured at 150° C. for 1 hour. The film was very slightly hazy, flexible, and could be bent double without cracking.

A similar film containing only the melamineformaldehyde resin and catalyst was also coated on aluminum and cured. In contrast, this film was very brittle and cracked when the aluminum was bent.

EXAMPLES 23 to 29

Following the procedure of Examples 1 to 14 a series of tetrapolymers were prepared. Polymer compositions and reaction conditions are summarized in Table II.

TABLE II

| | Product Copolymer | | | Reaction Conditions | | | | Feed Ratio E/Comonomer (c)/ | |
|---|---|---|---|---|---|---|---|---|---|
| Ex. No. | Copolymer Type | Monomer Ratio | Melt Index | Pressure (Atoms.) | Temp. (° C.) | Catalyst Type | Catalyst Concentration[2] | CO/Comonomer (d) (parts by wt.) | Conversion (%) |
| 23 | E/VA/CO/GMA | 70/18/9/3.5 | 60 | 1830 | 180 | RA-55 | .54 | 10/2.58/.17/.14 | 11.4 |
| 24 | E/VA/CO/AGE[1] | 68/17/12/2.9 | 40 | 1830 | 180 | RA-55 | .87 | 10/2.63/.45/.06 | 11.3 |
| 25 | E/MA[3]/CO/GMA | 72/11/13/4.2 | 45 | 1830 | 180 | RA-55 | 1.22 | 10/.25/.30/.11 | 10.8 |
| 26 | E/VA/CO/GMA | 68/22/8/2.9 | 400 | 1700 | 182 | RA-55 | 1.37 | 20/5.2/.30/.18 | 11.5 |
| 27 | E/VA/CO/GMA | 73/17/9/1.2 | 400 | 1700 | 181 | RA-55 | 1.89 | 20/6.6/.90/.21 | 11.0 |
| 28 | E/VA/CO/GMA | 62/21/14/3.2 | 500 | 1400 | 180 | RA-55 | 3.94 | 20/6.6/.90/.19 | 11.8 |
| 29 | E/VA/CO/GMA | 60/22/14/4.5 | 50 | 1830 | 181 | LUP 80 | 0.21 | 10/3.3/0.50/.12 | 12.6 |

LUP 80 = t-Butyl Peroxyisobutyrate
RA-55 = 2-t-Butyl Azo-2-Cyano-4-Methoxy-4-Methyl Pentane
[1]allyl glycidyl ether
[2]lbs./M lbs. of polymer
[3]methyl acrylate

CONTROL EXAMPLE 1 AND EXAMPLES 30 AND 31

Blends of phenolic resins, based on a 50/50 blend of wood flour and a two-step (novalak) phenolic resin, were made. 8 parts of hexamethylenetetramine were added in the blending step to provide a cure catalyst. All blends contain 40% wood flour for comparative purposes. The polymer of this invention was added to replace a portion of the phenolic, except for Control Example 1 where additional amount of the novalak phenolic resin was used in place of the tetrapolymer of the present invention. Bars ⅛ × ½ × 5 inches were molded at 100° C. and cured at 160° C. for 10 minutes.

From the results shown in Table III, it can be seen that one can obtain a higher tensile strength and higher flexural strain at failure with only a minor decrease in modulus (Example 30); or one can obtain a marked increase in flexural strain at failure, a large reduction in modulus with a relatively minor decrease in flexural strength (Example 31).

TABLE III

| Example No. | Additive Type | Additive Amount, % | Flexural Modulus ×10⁻³ psi | Flexural Strength ×10⁻³ psi | Flexural Strain at Failure, % |
|---|---|---|---|---|---|
| Control 1 | (Phenolic) | (20) | 1100 | 13 | 1.2 |
| 30 | Tetrapolymer of Example 28 | 20 | 800 | 14.5 | 1.9 |
| 31 | Tetrapolymer of Example 26 | 20 | 320 | 10 | 4.5 |

CONTROL EXAMPLE 2 AND EXAMPLES 32 AND 33

Blends of phenolic resin containing wood flour similar to Examples 30 and 31 were molded into ⅛ thick plaques and cured as previously described. The plaques were tested by a falling dart weighing ¼ lb. (Gardner Tester) to determine the height at which a crack appeared on the reverse side of the plaque. The results in Table IV show that the energy to break can be increased 2–3 fold, depending on the structure of the polymer added.

TABLE IV

| Example No. | Additive Type | Additive Amount, % | Energy to Break Inch - Pounds |
|---|---|---|---|
| Control 2 | (Phenolic) | (25) | 1.2 |
| 32 | Tetrapolymer of Example 28 | 25 | 2.3 |
| 33 | Tetrapolymer of Example 26 | 25 | 3.2 |

CONTROL EXAMPLE 3 AND EXAMPLES 34 AND 35

A commercial grade of a phenolic resin is compounded specifically with medium length glass fiber filler and various additives for use in electrical applications. This composition is coded Durez® 23570. Two tetrapolymers of the present invention were added to be 20% of the total composition. For comparison, 20% of a pure novalak phenolic resin was added to provide a control having the same amount of filler and additives. Samples were molded, cured and tested for electrical properties. In Table V, it is shown that the electrical properties are not seriously impaired. The volume resistivity, however, is improved at least 5-fold.

TABLE V

| Example No. | Additive Type | Additive Amount, % | Arc[1] Resistance (seconds) | Volume[2] Resistivity ×10¹¹ Ohm-Meters | Breakdown[3] Voltage Volts/Mil |
|---|---|---|---|---|---|
| Control 3 | (phenolic) | (20) | 108 | 0.23 | 1072 |
| 34 | Tetrapolymer of Example 28 | 20 | 81 | 14.5 | 1105 |
| 35 | Tetrapolymer of Example 26 | 20 | 140 | 2.2 | 1051 |

[1]Tungsten electrodes
[2]ASTM D257
[3]ASTM D149 - Samples about 0.040 inch thick

EXAMPLE 36

Elastomeric, cured products can be made when the phenolic resin is less than 50% of the blend. Examples of such behavior are given in Table VI. Note that the % elongation to failure is 100–200%, and the elastic recovery of this elongation after failure is about 90%.

TABLE VI

| Example No. | Phenolic Resin Used | Additive Type | Additive Amount, % | Stiffness 100% Secant Modulus, psi | Tensile Strength, psi | Elongation at Break, % | % Recovery After 30 Min. |
|---|---|---|---|---|---|---|---|
| 36 | Durez® 14000 | Tetrapolymer of Example 2 | 60 | 2710 | 3320 | 110 | 89 |
| 37 | Durez® 14000 | Tetrapolymer of Example 2 | 70 | 1540 | 2800 | 150 | 93 |
| 38 | Durez® 14000 | Tetrapolymer of Example 2 | 80 | 740 | 1960 | 190 | 92 |

CONTROL EXAMPLE 4 AND EXAMPLES 39 to 41

A commercial epoxy resin is filled with glass fibers and pelletized for injection molding uses (Fiberite® E 2748). Blends were made and evaluated as shown in Table VII.

TABLE VII

| Example No. | Additive Type | Additive Amount, % | Flexural Modulus ×10⁻³ psi | Flexural Strength ×10⁻³ psi | Flexural Strain to Failure, % | % Recovery | Izod Impact Strength Ft-lb/Inch |
|---|---|---|---|---|---|---|---|
| Control 4 | — | None | 1,440 | 16.2 | 1.1 | 100 | 0.39 |
| 39 | Tetrapolymer of Example 28 | 20 | 400 | 4.8 | 1.3 | 97 | 0.42 |
| 40 | Tetrapolymer of Example 26 | 20 | 210 | 5.0 | 3.8 | 90 | — |
| 41 | Tetrapolymer of Example 26 | 25 | 150 | 3.4 | 4.1 | — | 0.95 |

I claim:

1. A solid ethylene - carbon monoxide copolymer containing epoxy side groups, said copolymer consisting essentially of, by weight (a) 40 to 90 percent ethylene; (b) 2 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, alpha-olefins of 3 to 20 carbon atoms, norbornene, and vinyl aromatic compounds; and (d) 0.1 to 5.0 percent of an ethylenically unsaturated monomer of 4 to 21 carbon atoms containing an epoxy group.

2. A copolymer according to claim 1 wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl alkyl ethers.

3. A copolymer according to claim 2 wherein monomer (c) is taken from the class consisting of vinyl acetate, vinyl propionate, vinyl butyrate, methyl acrylate, ethyl acrylate, methyl methacrylate, dibutyl maleate, dimethyl fumarate, vinyl methyl ether and vinyl butyl ether.

4. A copolymer according to claim 3 wherein monomer (c) is vinyl acetate.

5. A copolymer according to claim 3 wherein monomer (c) is methyl acrylate.

6. A copolymer according to claim 3 wherein monomer (c) is methyl methacrylate.

7. A copolymer according to claim 1 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

8. A copolymer according to claim 7 wherein monomer (d) is taken from the class consisting of glycidyl methacrylate, glycidyl acrylate, glycidyl vinyl ether and vinyl cyclohexene monoxide.

9. A copolymer according to claim 8 wherein monomer (d) is glycidyl acrylate.

10. A copolymer according to claim 8 wherein monomer (d) is glycidyl methacrylate.

11. A copolymer according to claim 8 wherein monomer (d) is glycidyl vinyl ether.

12. A copolymer according to claim 1 wherein monomers (a) to (d) are present in amounts by weight (a) 45 to 90 percent, (b) 5 to 20 percent, (c) 10 to 33 percent, and (d) 0.2 to 3.0 percent.

13. A copolymer according to claim 1 wherein monomers (a) to (d) are present in amounts by weight (a) 50–70 percent, (b) 7 to 18 percent, (c) 20 to 20 percent, and (d) 0.5 to 2.0 percent.

14. A copolymer according to claim 12 wherein monomer (c) is vinyl acetate and monomer (d) is glycidyl methacrylate.

15. A copolymer according to claim 13 wherein monomer (c) is vinyl acetate and monomer (d) is glycidyl acrylate.

16. A solid ethylene - carbon monoxide copolymer containing epoxy side groups, said copolymer consisting essentially of, by weight (a) 40 to 90 percent ethylene; (b) 2 to 20 percent carbon monoxide; (c) 5 to 40 percent of a monomer copolymerizable therewith to provide flexible polymers, said monomer taken from the class consisting of unsaturated mono- or dicarboxylic acids of 3 to 20 carbon atoms, esters of said unsaturated mono- or dicarboxylic acids, vinyl esters of saturated carboxylic acids where the acid group has 1 to 18 carbon atoms, vinyl alkyl ethers where the alkyl group has 1 to 18 carbon atoms, acrylonitrile, methacrylonitrile, alpha-olefins of 3 to 20 carbon atoms, norbornene, and vinyl aromatic compounds; and (d) 0.2 to 15 percent of an ethylenically unsaturated monomer of 4 to 21 carbon atoms containing an epoxy group.

17. A copolymer according to claim 16 wherein monomer (c) is taken from the class consisting of vinyl esters of saturated carboxylic acids where the acid group has 1 to 18 carbon atoms, esters of unsaturated mono- or dicarboxylic acids of 3 to 20 carbon atoms and vinyl alkyl ethers.

18. A copolymer according to claim 17 wherein monomer (c) is taken from the class consisting of vinyl acetate, vinyl propionate, vinyl butyrate, methyl acrylate, ethyl acrylate, methyl methacrylate, dibutyl maleate, dimethyl fumarate, vinyl methyl ether and vinyl butyl ether.

19. A copolymer according to claim 18 wherein monomer (c) is vinyl acetate.

20. A copolymer according to claim 18 wherein monomer (c) is methyl acrylate.

21. A copolymer according to claim 18 wherein monomer (c) is methyl methacrylate.

22. A copolymer according to claim 16 wherein monomer (d) is taken from the class consisting of epoxy esters of copolymerizable unsaturated organic acids, epoxy ethers of vinyl ethers, epoxy ethers of allyl ethers and mono-epoxy substituted di-olefins of 4 to 12 carbon atoms.

23. A copolymer according to claim 22 wherein monomer (d) is taken from the class consisting of glycidyl methacrylate, glycidyl acrylate, glycidyl vinyl ether and vinyl cyclohexene monoxide.

24. A copolymer according to claim 23 wherein monomer (d) is glycidyl acrylate.

25. A copolymer according to claim 23 wherein monomer (d) is glycidyl methacrylate.

26. A copolymer according to claim 23 wherein monomer (d) is glycidyl vinyl ether.

27. A copolymer according to claim 16 wherein monomers (a) to (d) are present in amounts by weight (a) 45 to 90 percent, (b) 5 to 20 percent, (c) 10 33 percent, and (d) 0.4 to 9 percent.

28. A copolymer according to claim 16 wherein monomers (a) to (d) are present in amounts by weight (a) 50 to 70 percent, (b) 7 to 18 percent, (c) 20 to 30 percent, and (d) 1 to 6 percent.

29. A copolymer according to claim 27 wherein monomer (c) is vinyl acetate and monomer (d) is glycidyl methacrylate.

30. A copolymer according to claim 28 wherein monomer (c) is vinyl acetate and monomer (d) is glycidyl acrylate.

* * * * *